E. EINFELDT.
METHOD OF MAKING BUTT WELDS.
APPLICATION FILED JULY 9, 1909.

1,062,641.

Patented May 27, 1913.

UNITED STATES PATENT OFFICE.

EMIL EINFELDT, OF DAVENPORT, IOWA, ASSIGNOR, BY MESNE ASSIGNMENTS, TO G. WATSON FRENCH, NATHANIEL FRENCH, AND JOSEPH L. HECHT, COMPOSING THE FIRM OF FRENCH & HECHT, OF DAVENPORT, IOWA.

METHOD OF MAKING BUTT-WELDS.

1,062,641. Specification of Letters Patent. Patented May 27, 1913.

Application filed July 9, 1909. Serial No. 506,707.

*To all whom it may concern:*

Be it known that I, EMIL EINFELDT, of Davenport, county of Scott, and State of Iowa, have invented a new and useful Improvement in Methods of Making Butt-Welds, of which the following is a specification.

This invention relates to an improved method of forming butt-welds, and is designed more particularly for use in connection with the production of wheel tires, the improved method consisting in providing a tire strip or blank; bending the same into general circular form and in such manner that the spring or resiliency of the metal will tend to urge the two ends circumferentially past each other; abutting said ends so that they will be held under pressure by the spring of the metal in forcible engagement or contact; and finally heating the abutting ends to soften them; whereby they will, by circumferential pressure, upset into each other and form a weld.

Figure 1:
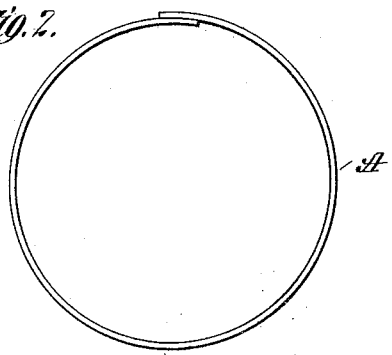
Figure 1:
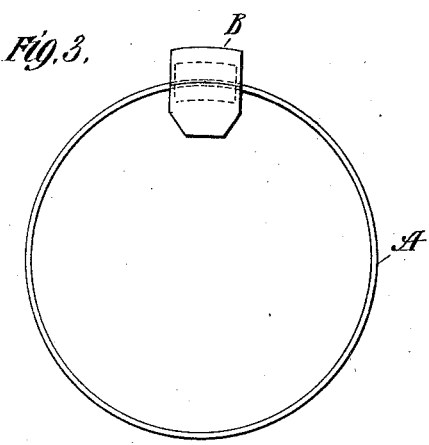
Figure 1:
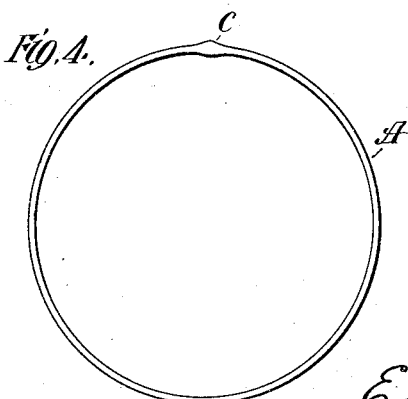

In the accompanying drawings, which illustrate the steps of the method, Figure 1 represents a tire strip or blank. Fig. 2 represents the same bent into general circular form with its ends overlapping. Fig. 3 represents the tire blank with its ends abutting and held under pressure in forcible contact by the natural spring or resiliency of the metal, said figure illustrating also the means for heating the abutting ends to form the weld. Fig. 4 represents the tire welded.

In proceeding to carry my improved method into effect, I first provide a strip or blank A of metal, and next, by any suitable means, such for instance as by a rolling method, bend this strip into general circular form and in such manner that when released the ends of the strip will have a tendency to move past each other circumferentially, the said tendency being produced by the natural spring or resiliency of the metal and the degree of bending to which it is subjected. In Fig. 2 this bent strip is represented in the condition it will assume when released, where it will be seen that the ends have moved past each other and overlap. These overlapping ends are next drawn-out in opposite directions and caused to abut, as shown in Fig. 3, with the result that the spring of the metal will cause the abutting ends to press forcibly against each other. Heat is now applied to the abutting ends in any suitable manner, such for instance as by the muffle-furnace B, as shown in Fig. 3, and the ends are heated sufficiently to soften them enough to form the weld. When this softening takes place, the abutting ends will, by the spring of the metal, be forced into each other endwise and thereby upset, producing a butt-weld as shown at C Fig. 4. After the weld has been thus formed, it may be smoothed down and shaped-up by any suitable means.

From the foregoing description it will be seen that the welding pressure between the parts, which is necessary for the formation of a butt-weld, is produced by the natural resiliency or spring of the metal, due to the bend which is given the same to produce the general circular form of the tire. Inasmuch as the diameter of the tire will be slightly reduced when the softened ends upset into each other, the tire blank should, in the first instance, be somewhat longer than the circumference of the finished tire, in order that sufficient metal may be furnished to provide for this reduction in diameter. As far as I am aware this manner of effecting a butt-weld is broadly new in the art, and I desire to be understood as making broad claim for the same.

Having thus described my invention, what I claim is:—

1. The method of forming a butt-weld between parts consisting of spring metal, which method consists in so disposing the ends to be welded that they will have a tendency to spring past each other in opposite directions, abutting said ends to cause them to contact forcibly, and finally applying heat sufficient to soften the abutting ends to permit them to become welded.

2. The method of butt-welding the ends of a strip or blank together, which consists in bending the blank between its ends in such manner that the ends will be brought together and will have a tendency to move past each other in opposite directions without the application of external force, abutting the ends of the bent blank to cause the said ends to contact forcibly, and finally applying sufficient heat to soften the abutting ends to permit them to become welded together.

3. The method of making wheel tires which consists in providing a metal blank or strip greater in length than the circumference of the finished tire, bending said blank into approximately circular form and so that its ends will have a tendency to spring past each other circumferentially, abutting said ends to cause them to contact forcibly, and finally applying heat sufficient to weld the abutting ends.

In testimony whereof I hereunto set my hand this 26th day of June, 1909, in the presence of two attesting witnesses.

EMIL EINFELDT.

Witnesses:
ANDREW NEILSON,
SARAH NEILSON.

---

Copies of this patent may be obtained for five cents each, by addressing the "Commissioner of Patents, Washington, D. C."